United States Patent [19]

Higuchi et al.

[11] Patent Number: 4,969,687
[45] Date of Patent: Nov. 13, 1990

[54] PASSENGER SEAT FOR MOTOR VEHICLE

[75] Inventors: Takahiro Higuchi; Toshiro Matsushima, both of Tochigi; Akio Yanaka, Saitama, all of Japan

[73] Assignee: Hondo Giken Kogyo Kabushiki Kaisha, Tokyo, Japan

[21] Appl. No.: 347,300

[22] Filed: May 4, 1989

[30] Foreign Application Priority Data

May 11, 1988 [JP] Japan .............................. 63-61956[U]
May 12, 1988 [JP] Japan .............................. 63-62590[U]

[51] Int. Cl.⁵ ............................ A47C 7/02; B60N 1/00
[52] U.S. Cl. ...................................... 297/452; 297/458
[58] Field of Search ................... 297/452, 458; 296/63, 296/68.1; 248/393, 394, 395, 396, 397

[56] References Cited

U.S. PATENT DOCUMENTS

| 4,492,408 | 1/1985 | Lohr | 297/452 |
| 4,648,578 | 3/1987 | Sakamoto | 248/396 |
| 4,761,036 | 8/1988 | Vogel | 297/452 |

FOREIGN PATENT DOCUMENTS

| 501051 | 2/1951 | Belgium | 297/458 |
| 511801 | 8/1931 | United Kingdom | 297/452 |

Primary Examiner—Peter R. Brown
Attorney, Agent, or Firm—Armstrong, Nikaido, Marmelstein, Kubovcik & Murray

[57] ABSTRACT

A passenger seat for use as a front seat in a motor vehicle is highly rigid and provides a space beneath a seat cushion for allowing a rear seat passenger to put front foot ends therein. The passenger seat has a seat frame comprising a main frame having a pair of beams disposed on opposite rear side thereof and extending rearwardly, and a substantially U-shaped opening defined in a rear central portion thereof and opening rearwardly, and a reinforcing frame interconnecting rear ends of the beams.

8 Claims, 5 Drawing Sheets

PASSENGER SEAT FOR MOTOR VEHICLE

BACKGROUND OF THE INVENTION

1. Field of the Invention

The present invention relates to a passenger seat for use in a motor vehicle, and more particularly to a passenger seat suitable for use as a front seat in a motor vehicle.

2. Description of the Relevant Art

Generally, conventional passenger seats for motor vehicles such as automobiles have a plurality of springs extending between confronting members of a seat frame and a cushioning pad disposed on the springs. Motor vehicle passenger seats are required to have a sufficient degree of rigidity to withstand inertial forces applied when the motor vehicle starts to move or in other occasions in which the motor vehicle is subject to acceleration. Front passenger seats are also required to provide a space between the lower surface of the rear portion of the seat cushion and the motor vehicle floor, which space is wide enough for rear seat passengers to put their feet therein.

To meet the above requirements, Japanese Laid-Open Utility Model Publication No. 63-77547 discloses a front passenger seat designed for allowing a rear seat passenger to insert the feet below the front passenger seat, the front passenger seat retaining a desired level of rigidity. The front passenger seat includes a seat frame having a substantially U-shaped opening defined centrally in a rear portion thereof and two superposed panels joined to the seat frame and providing in a front portion of the seat frame a plurality of transverse reinforcing members of closed hollow cross section. The front passenger seat also has a pair of beams of closed hollow cross section disposed on lateral sides, respectively, of the seat frame and extending rearwardly.

With the disclosed passenger seat, the U-shaped opening defined in the rear central portion of the seat frame tends to create a gap between the lower end of the seat back and the rear end of the seat cushion, and also is liable to permit the rear central portion of the seat to flex down when a passenger is seated on the seat. In the disclosed passenger seat, a plate is supported on the seat frame by coil springs, and a cushioning pad is mounted on the plate. Therefore, the passenger seat may not have a proper body pressure distribution when a passenger of a different body profile is seated. The plate may be replaced with a plurality of zigzag springs. However, the rear ends of some of the zigzag springs could not be supported on the seat frame because of the opening defined in the rear central portion of the seat frame.

SUMMARY OF THE INVENTION

It is an object of the present invention to provide a passenger seat for use in a motor vehicle, which has a high degree of rigidity, provides a space below a seat cushion for allowing a rear seat passenger to place the feet therein, and prevents a gap from being created between the rear end of the seat cushion and the lower end of a seat back to avoid excessive flexure of the seat cushion when a passenger is seated on the passenger seat, thereby giving the passenger an increased level of seating comfort.

According to the present invention, a passenger seat for use in a motor vehicle comprises a seat frame comprising a main frame having a pair of beams disposed on opposite rear sides thereof and extending rearwardly, and a substantially U-shaped opening defined in a rear central portion thereof and opening rearwardly, and a reinforcing frame interconnecting rear ends of the beams.

With the above arrangement, the rear portion of the seat frame is increased by the reinforcing frame extending between the rear ends of the main frame across the U-shaped opening. A cushioning pad is supported over the opening by the reinforcing frame. According to a preferred embodiment of the present invention, the rear ends of a plurality of cushion springs are connected to each other, and supported by support springs extending between the beams and the cushion springs. The cushion springs can be individually deformed elastically when a passenger is seated on the seat. The cushion springs do not project downwardly from the opening and hence do not reduce the size of a space below the seat frame.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
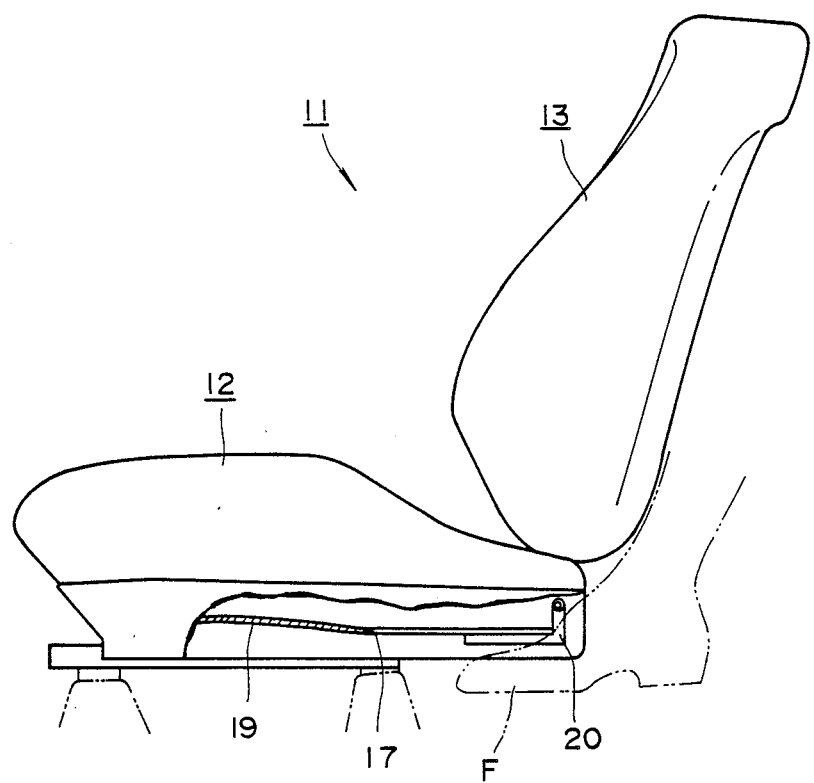
FIG. 1 is a side elevational view of a passenger seat for a motor vehicle according to an embodiment of the present invention.

As shown in FIG. 1, a passenger seat 11 for use in a motor vehicle such as an automobile generally comprises a seat cushion 12 and a seat back 13. The rear end of the seat cushion 12 and the lower end of the seat back 13 are angularly movably coupled to each other by a reclining mechanism (not shown).

Figure 2:
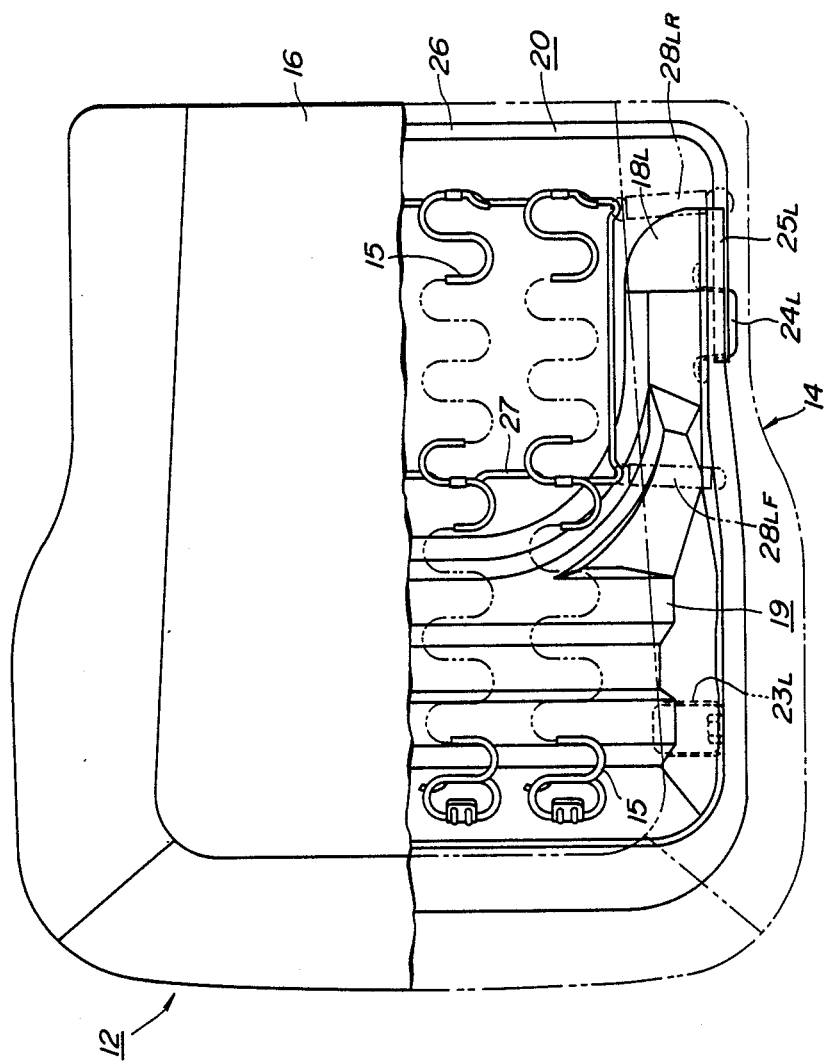
FIG. 2 is plan view of a seat cushion of the passenger seat, with a cushioning pad being cut away by half.
Figure 3:
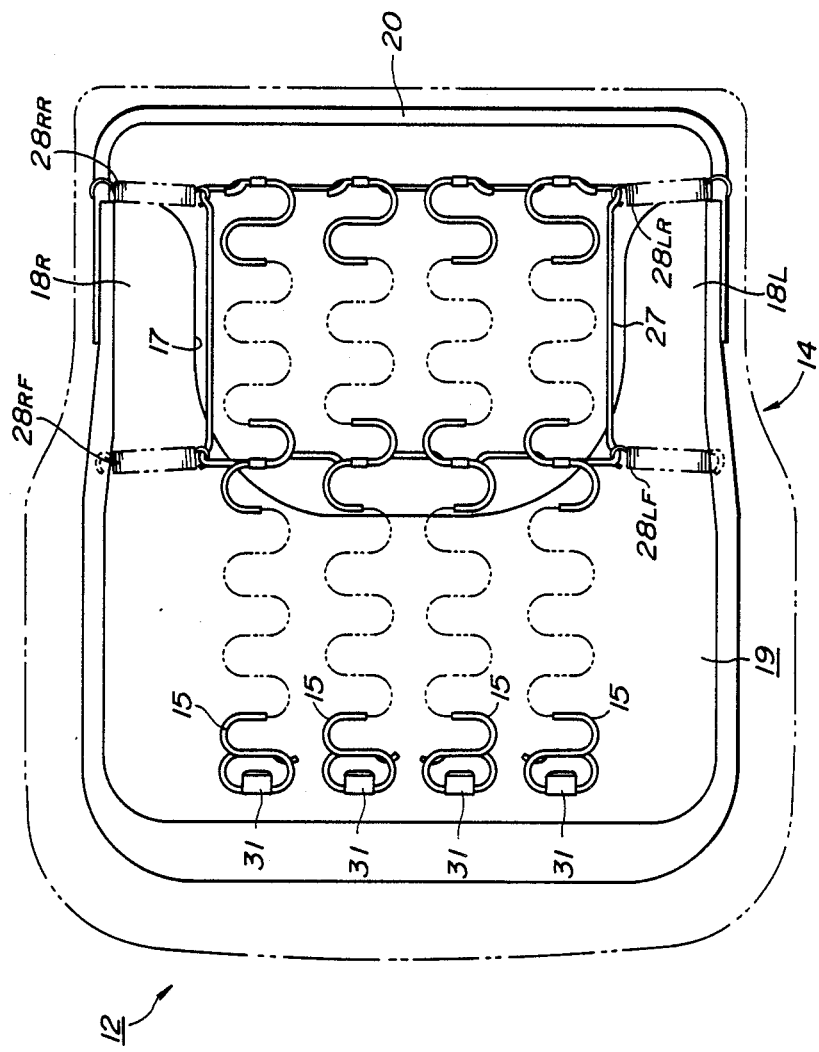
FIG. 3 is a plan view of the seat cushion with the cushioning pad omitted from illustration.

As illustrated in FIGS. 2 and 3, the seat cushion 12 has a plurality of cushion springs 15 extending parallel to each other in a fore-and-aft direction, the cushion springs 15 being supported on a seat frame 14. A cushioning pad 16 with an upholstered upper surface is placed on the cushion springs 15.

Figure 5:
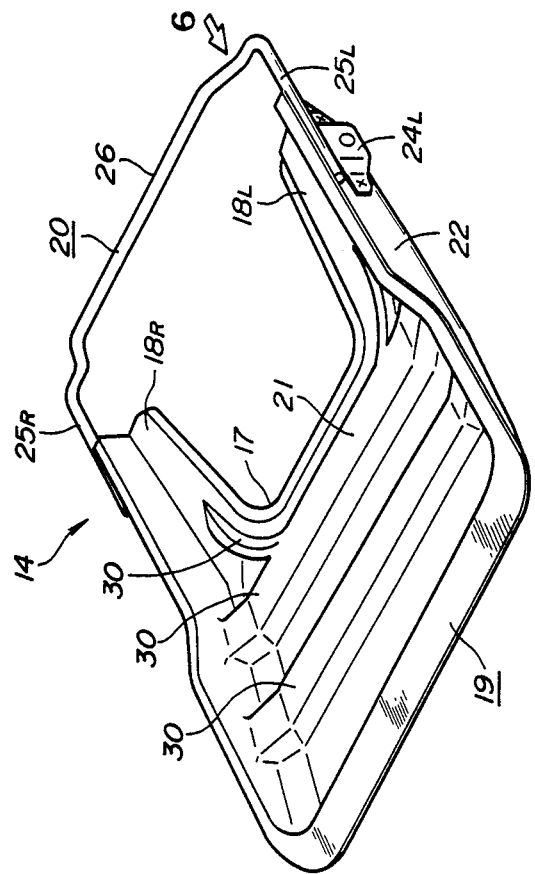
FIG. 5 is a perspective view of a seat frame of the passenger seat.
Figure 6:
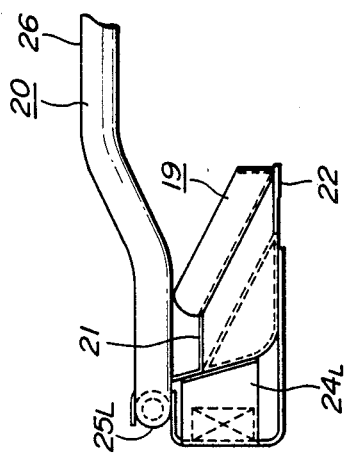
FIG. 6 is an enlarged fragmentary rear view of the seat frame as viewed in the direction indicated by the arrow VI.

As shown in FIG. 5, the seat frame 14 comprises a main frame 19 and a reinforcing frame 20. The main frame 19 has a downwardly concave central portion and a pair of lateral portions extending rearwardly into beams 18L, 18R, with a substantially U-shaped opening 17 which opens rearwardly.

Figure 4:
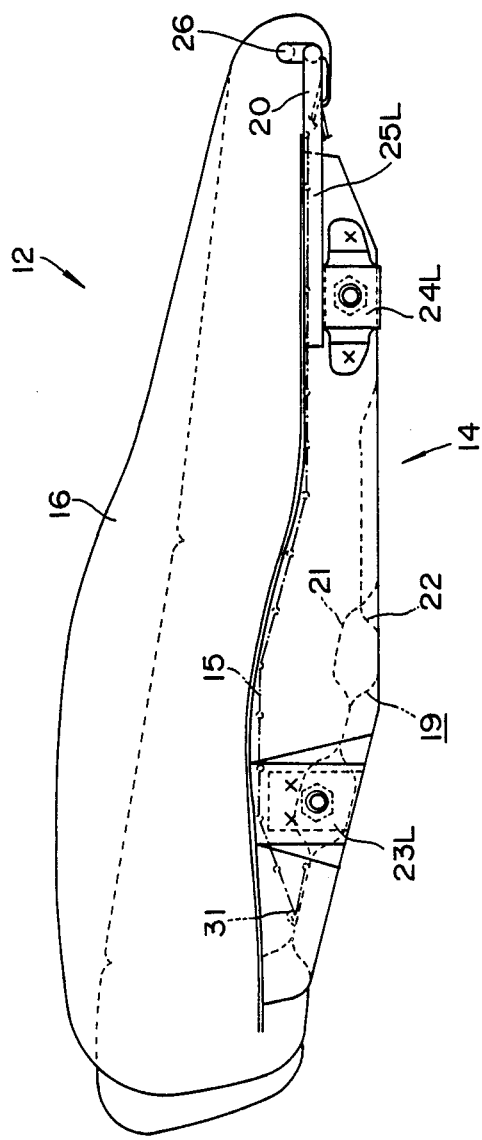
FIG. 4 is a side elevational view of the seat cushion.

As illustrated in FIGS. 4 and 5, the main frame 19 comprises upper and lower corrugated panels 21, 22 placed in overlapping relation and joined to each other by spot welding or the like, the panels 21, 22 jointly providing a plurality of reinforcing portions 30 each of a closed hollow cross section. The rearmost reinforcing portion 30 is curved in a substantially U shape extending around the edge of the U-shaped opening 17 and serving as the proximal regions of the beams 18L, 18R. Front brackets 23L, 23R are fixed respectively to front outer sides of the main frame 19, and rear brackets 24L, 24R are fixed respectively to substantially central outer sides of the beams 18L, 18R. The brackets 23L, 23R, 24L, 24R are slidably mounted by shoes on seat rails (not shown) on the floor panel of the motor vehicle. Therefore, the main frame 19 is supported on the floor panel for back-and-forth movement along the seat rails.

The reinforcing frame 20 comprises a solid rod or pipe having a circular cross section and bent into a substantially U shape, the reinforcing frame 20 interconnecting the beams 18L, 18R of the main frame 19. The reinforcing frame 20 has on its opposite ends attachment portions 25L, 25R welded or otherwise fixed to the rear brackets 24L, 24R, respectively, and also has a central bridge portion 26 interconnecting the attachment portions 25L, 25R. The attachment portions 25L, 25R extend respectively along the beams 18L, 18R of the main frame 19. The rear ends of the attachment portions 25L, 25R are bent inwardly and then upwardly to provide an upwardly bent U-shaped portion that serves as the bridge portion 26 which extends parallel to the upper surface of the main frame 19 and across the opening 17 in the main frame 19.

As shown in FIG. 3, the cushion springs 15 have front ends fixed by respective hooks 31 to the upper surface of the front end of the main frame 19 and rear ends connected to each other by means of a border wire 27 extending in a rectangular shape over the opening 17. The cushion springs 15 comprise zigzag springs in the illustrated embodiment.

Coil springs 28LF, 28LR, 28RF, 28RR are connected between the four corners of the border wire 27 and opposite side members of the main frame 19. The zigzag springs 15 are therefore supported on the main frame 19 under the resiliency of these coil springs 28LF, 28LR, 28RF, 28RR. The coil springs 28LF, 28LR, 28RF, 28RR extend laterally with respect to the seat cushion 12 and have downwardly inclined portions which engage the border wire 27. The coil springs 28LF, 28RF have ends engaging the front corners, respectively, of the border wire 27 and opposite ends engaging the main frame 19 near the proximal ends, respectively, of the beams 18L, 18R. the coil springs 28LR, 28RR have ends engaging the rear corners, respectively, of the border wire 27 and opposite ends engaging the distal ends, respectively, of the beams 18L, 18R.

The beams 18L, 18R projecting rearwardly from the main frame 19 are thus interconnected by the reinforcing frame 20 to increase the rigidity of the seat frame 14 to prevent the rear portion of the seat frame 14 from being deformed under stresses.

Since the rear portion of the main frame 19 has the opening 17 defined therein and the central portion of the reinforcing frame 20 extending between the beams 18L, 18R at the rear end of the opening 17 is bent upwardly into the U shape, a substantial space is created between the rear portion of the seat cushion 12 and the floor panel for allowing a rear seat passenger to put the front foot ends F into the space. Therefore, the rear seat passenger is given a high level of seating comfort.

The weight of a passenger seated on the seat 11 is borne by the zigzag springs 15 through the cushioning pad 16, so that the zigzag springs 15 are extended depending on the body pressure distribution according to the body profile of the passenger. Since the zigzag springs 15 are individually extended resiliently according to the body pressure distribution, the passenger can have good seating comfort. Because the front ends of the zigzag springs 15 are fixed to the main frame 19 and the rear ends thereof supported by the coil springs 28LF, 28LR, 28RF, 28RR, no gap will be produced between the lower end of the seat back 18 and the rear end of the seat cushion 12, and hence the seat cushion 12 will not be excessively flexed under the weight of the passenger seated thereon. Better seating comfort may be given to the passenger seated on the seat 11 since it is possible to impart initial stresses to the zigzag springs 15 for increased spring rigidity.

With the present invention, as described above, the rigidity of the seat, particularly the rear portion thereof, is increased, and a space can be created beneath the seat cushion for a rear seat passenger to put the front foot ends therein. A cushioning pad having a sufficient thickness may be mounted on the seat frame over the opening in the rear portion thereof. Inasmuch as the zigzag springs can be individually elastically deformed, the seat cushion can give good seating comfort to a seated passenger irrespective of the body profile of the passenger. The zigzag cushion springs do not project downwardly from the opening in the main frame, and thus do not reduce the size of the space below the seat frame.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A passenger seat for use in a motor vehicle, comprising:
    a seat frame including a main frame having front and rear edges, and a pair of beams oppositely disposed on said rear edge and extending rearwardly, said rear edge and said rearwardly extending beams defining a U-shaped opening, said main frame further having a reinforcing frame interconnecting rear portions of said beams, and said main frame being defined by a pair of corrugated panels joined to each other in confronting relation to each other.

2. A passenger seat according to claim 1, wherein said corrugated panels include a plurality of reinforcing portions, each having a closed hollow cross-section.

3. A passenger seat according to claim 2, wherein at least one of said reinforcing portions has a substantially U shape extending along an edge of said substantially U-shaped opening.

4. A passenger seat according to claim 1, wherein said reinforcing frame comprises a solid rod having a circular cross section.

5. A passenger seat according to claim 1, wherein said reinforcing frame includes a central portion bent upwardly into a U shape and serving as a bridge portion.

6. A passenger seat according to claim 5, wherein said reinforcing frame comprises a solid rod having a circular cross section.

7. A passenger seat for use in a motor vehicle, comprising:
    a seat frame having front and rear edges, and a pair of beams oppositely disposed on said rear edge and extending rearwardly, said rear edge and said rearwardly extending beams defining a U-shaped opening;

a plurality of cushion springs arranged in a single layer supported on said seat frame and having front ends fixed to said front side of said seat frame and rear ends connected to each other, said cushion springs extending in a fore-and-aft direction of said seat frame;

a cushioning pad mounted on said cushion springs; and a plurality of support springs extending laterally with respect to said seat frame and supporting said cushion springs between said beams.

8. A passenger seat according to claim 7, further including a border wire extending in a substantially rectangular shape and only over said opening in said seat frame, said rear ends of said cushion springs being interconnected by said border wire, said support springs having ends engaging corners of said border wire and other ends engaging a reinforcing frame interconnecting rear portions of said beams

* * * * *